(12) United States Patent
Ames et al.

(10) Patent No.: US 7,323,107 B2
(45) Date of Patent: Jan. 29, 2008

(54) APPARATUS AND METHOD FOR THE TREATMENT OF WASTE

(75) Inventors: Roy Victor Ames, Hawthorne (AU); Matthew John Etherington, Maraylya (AU); Nicholas Michael Czeperko, Rochedale (AU); Ian Joseph Ugarte, Berowra Waters (AU)

(73) Assignee: Aqua Clarus Holdings Pty Ltd, Windaroo (AU)

( * ) Notice: Subject to any disclaimer, the term of this patent is extended or adjusted under 35 U.S.C. 154(b) by 0 days.

(21) Appl. No.: 11/251,559

(22) Filed: Oct. 14, 2005

(65) Prior Publication Data

US 2006/0108282 A1 May 25, 2006

Related U.S. Application Data

(63) Continuation of application No. PCT/AU2004/000513, filed on Apr. 16, 2004.

(30) Foreign Application Priority Data

Apr. 16, 2003 (AU) .............................. 2003901856

(51) Int. Cl.
*C02F 3/00* (2006.01)
(52) U.S. Cl. .................. 210/602; 210/220; 210/532.2; 210/197
(58) Field of Classification Search ................ 210/197, 210/532.2, 220, 602
See application file for complete search history.

(56) References Cited

U.S. PATENT DOCUMENTS

| 2,642,394 | A | * | 6/1953 | Paulette et al. ............. 210/617 |
|---|---|---|---|---|
| 4,599,174 | A | * | 7/1986 | McDowell .................. 210/614 |
| 5,094,752 | A | * | 3/1992 | Davis et al. ................. 210/614 |
| 5,725,770 | A | | 3/1998 | Henry |
| 5,741,416 | A | * | 4/1998 | Tempest, Jr. ................. 210/90 |
| 6,319,407 | B1 | | 11/2001 | Maatta et al. |

(Continued)

FOREIGN PATENT DOCUMENTS

AU 722651 6/1998

(Continued)

OTHER PUBLICATIONS

"Written Opinion for Application No. PCT/AU2004/000513, date mailed Nov. 3, 2005", 6 Pages.

(Continued)

*Primary Examiner*—Chester T. Barry
(74) *Attorney, Agent, or Firm*—Schwegman, Lundberg & Woessner P.A.

(57) ABSTRACT

A waste treatment system suitable for domestic use and capable of producing water suitable for recycling within the household. The system includes a bioreactor (30) and a decomposition chamber (16). The bioreactor (30) is adapted to digest liquid-base waste material using bacteria and is operable under anaerobic, anoxic and/or aerobic conditions. The decomposition chamber (16) decomposes substantially solid waste generated in the bioreactor. The bioreactor and decomposition chamber are in fluid communication such that substantially solid waste material generated in the bioreactor can be transferred to the decomposition chamber for further treatment. Resulting solids may optionally be forwarded to a vegetation cell (24) and the liquid (34) leaving the bioreactor may be optionally passed to a membrane treatment unit (40) and a disinfection unit (50).

30 Claims, 2 Drawing Sheets

U.S. PATENT DOCUMENTS

| | | | |
|---|---|---|---|
| 7,022,237 B2 * | 4/2006 | Couch | 210/622 |
| 2005/0194311 A1 * | 9/2005 | Rozich | 210/614 |
| 2005/0244328 A1 * | 11/2005 | Schmitz et al. | 423/477 |
| 2006/0254978 A1 | 11/2006 | Ames et al. | |

FOREIGN PATENT DOCUMENTS

| | | | |
|---|---|---|---|
| GB | 2077712 A | | 12/1981 |
| GB | 2396348 A | * | 6/2004 |
| WO | WO-9901385 A1 | | 1/1999 |
| WO | WO-0066501 A1 | | 11/2000 |
| WO | WO-0190006 A1 | | 11/2001 |
| WO | WO-0246127 A2 | | 6/2002 |
| WO | WO-02089957 A1 | | 11/2002 |

OTHER PUBLICATIONS

"International Search Report from Application No. PCT/AU2004/000513, date mailed Jul. 22, 2004", 5 pages.

Amendment and Response mailed Jan. 8, 2007 in U.S. Appl. No. 11/491,697, 18 pgs.

Amendment and Response to Final Office Action mailed May 30, 2007 in U.S. Appl. No. 11/491,697, 31 pgs.

Final Office Action mailed Mar. 30, 2007 in U.S. Appl. No. 11/491,697, 8 pgs.

Non-Final Office Action mailed Sep. 7, 2006 in U.S. Appl. No. 11/491,697, 7 pgs.

Notice of Allowance mailed Jul. 2, 2007 in U.S. Appl. No. 11/491,697, 8 pgs.

* cited by examiner

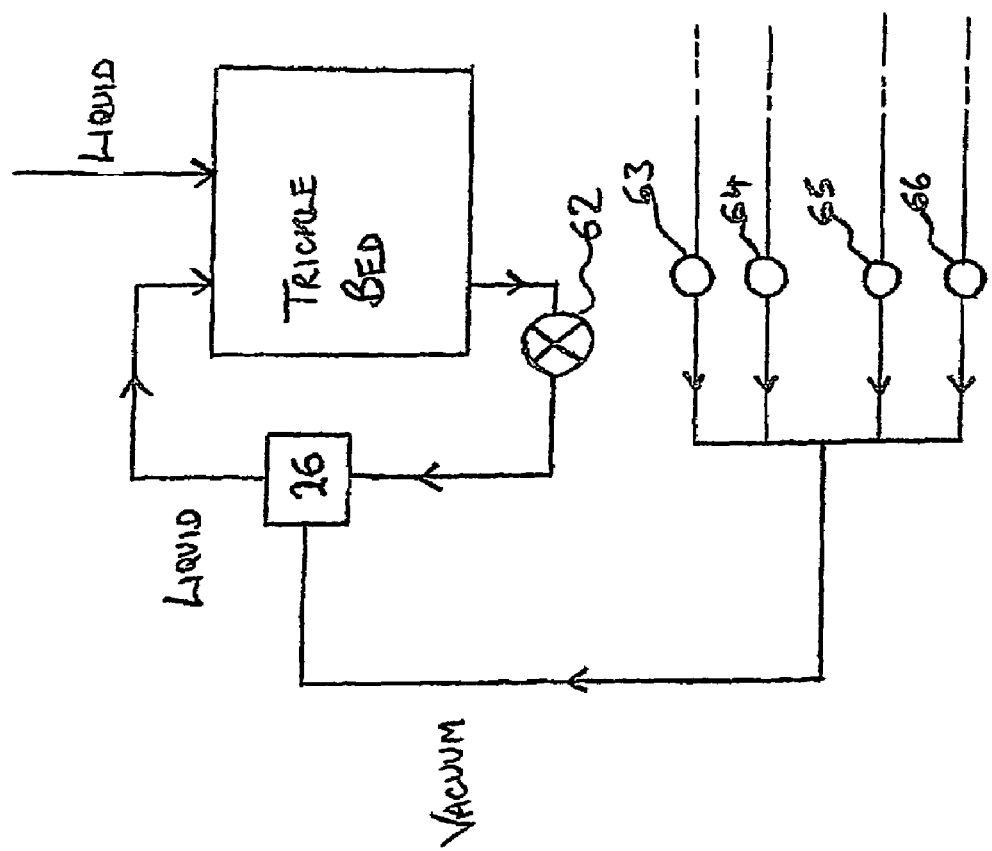

APPARATUS AND METHOD FOR THE TREATMENT OF WASTE

RELATED APPLICATIONS

This application is a continuation application under 35 U.S.C. 111(a) of PCT/AU2004/000513 filed Apr. 16, 2004 and published in English as WO 2004/092079 A1 on Oct. 28, 2004; which International Application claims priority from Australian Application No. 2003901856, filed Apr. 16, 2003; which applications and publication are incorporated herein by reference and made a part hereof.

FIELD OF THE INVENTION

This invention relates to a waste treatment system suitable for domestic use. It has been developed primarily as a system, which allows households to recycle sewage and other waste for domestic re-use.

BACKGROUND OF THE INVENTION

Any discussion of the prior art throughout the specification should in no way be considered as an admission that such prior art is widely known or forms part of common general knowledge in the field.

The management and treatment of domestic sewage and other waste is a growing problem facing cities and other populated areas. In highly populated areas, there is often a lack of appropriate sewage treatment facilities. If the sewage is not appropriately treated, it can contaminate water supplies and subsequently affect the health of inhabitants. There are an increasing number of areas where septic systems are causing problems with odour. Moreover, their impact on groundwater quality, and their use without some form of upgrade is being discouraged. In some areas, new septic systems are banned.

One approach to the problem has been the development of onsite treatment systems that either incorporate a septic system or use a similar anaerobic process as the first stage of the treatment system. They are often followed by a bioreactor/aeration system. Clarification follows either by settling, sand filtration, and in a few cases membrane filtration.

Many of these onsite treatment systems have relatively high operating costs, are often unreliable and require regular servicing. In the majority of systems there is a need to remove solids from the system and take away from the site on a regular basis (e.g. every 1-3 years depending on the load on the system). Government authorities are very concerned about the lack of management of these systems and, as a result, the discharge of water that does not meet the required standards.

In many countries the reuse of water is being encouraged. Many onsite systems produce water for surface irrigation of the required standard, but there are few domestic systems available that reliably produce water of a standard that can be recycled back to the home for non-potable use or have low enough nutrient levels to be disposed of on relatively small blocks of land.

WO02/089957 describes a treatment system for the treatment of primary waste on site. However, this treatment system alone does not produce water of high enough quality to be recycled back into the home for domestic use.

It would be desirable to provide a domestic waste treatment system, which produces water of high enough quality to be recycled back into the home for domestic use (e.g. non-potable use). It would be further desirable to provide a domestic waste treatment system, which is self-contained and which does not require regular human intervention to operate efficiently on a long-term basis.

It is an object of the present invention to overcome or ameliorate at least one of the disadvantages of the prior art, or to provide a useful alternative.

SUMMARY OF THE INVENTION

Accordingly, in a first aspect the present invention provides a waste treatment system suitable for domestic use comprising:

a bioreactor for digesting liquid-based waste material using bacteria, said bioreactor being operable under anaerobic, anoxic and/or aerobic conditions; and a decomposition chamber for decomposing substantially solid waste material generated in the bioreactor;

wherein the bioreactor and the decomposition chamber are in fluid communication such that the substantially solid waste material generated in the bioreactor can be transferred to the decomposition chamber for further treatment.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

As used herein, the term "liquid-based waste material" refers to any domestic waste material which is essentially a liquid. However, the term includes liquid waste materials containing solids, such as sewage. These waste materials are still liquid-based in the sense that the majority of the waste material is liquid with solids dispersed or distributed throughout the liquid.

As used herein, the term "substantially solid waste" refers to a solid waste material, such as excess biosolids, generated in the bioreactor. This waste material will still contain some residual liquid and is a flowable material, in the sense that it may be pumped, siphoned or drained into the decomposition chamber. In the same sense, the term "fluid communication" means communication of flowable materials, which flowable materials, of course, include the substantially solid waste referred to above. Typically, fluid communication will be in the form of a hose, pipe or conduit.

The waste treatment system of the present invention is intended for "domestic use". Domestic use may be the recycling of waste material (e.g. sewage) from a single household back to the same household. Thus, individual homes may install the waste treatment system of the present invention in a basement, outhouse, or other suitable area. However, domestic use may also include the relatively small scale treatment of waste material from a collection of households (e.g up to 1000 households). Hence, the waste treatment system of the present invention may be used as a common treatment system for a collection of homes.

Moreover, whilst the waste treatment system of the present invention is suitable for domestic use, the invention is not in any way limited to this use. It will be appreciated that it would be equally suitable in some small- or medium-sized industries having an organic waste stream.

As is evident from the context, the term "transferred" means the transfer of material via the fluid communication e.g. by pumping, siphoning or even draining under gravity. For the avoidance of doubt, the term does not include transferring by manual intervention, such as scooping of solid waste and manually transferring.

The invention, in its preferred form, is advantageous because it provides a completely self-contained, simple system for handling and recycling household waste material, such as sewage, and provides a means for minimising and handling the biosolids formed. Previous attempts to solve the problem of recycling household waste suffered from an inability to cope with solid waste, either in the waste itself or generated in a bioreactor. Generally, the prior art systems separate solid waste generated in bioreactors by filtering or sieving (see, for example, U.S. Pat. No. 5,725,770). This necessarily requires regular maintenance and human intervention. Regular human intervention in handling solid waste material is unpleasant and discourages the use of domestic waste treatment systems. The present invention, being compact, self-contained and requiring minimal handling of biosolids in its preferred form, is therefore a significant improvement over known waste treatment systems.

Preferably, the decomposition chamber is maintained under aerobic conditions. Aerobic conditions are preferably maintained by passive aeration of the decomposition chamber by means of one or more vents.

Preferably, the decomposition chamber comprises at least one mesh screen, more preferably a plurality of mesh screens arranged such that solid material passes through each mesh screen. There may be, for example, two, three or four mesh screens. Typically, the mesh screens are disposed substantially horizontally and stacked substantially vertically. Thus, the solid waste material will typically be treated on an uppermost mesh screen and, once treated, fall to the next mesh screen below and so on. A lower screen may be inclined to direct decomposed particulate solids towards a solids pump well.

Preferably, the mesh sizes of the mesh screens are graduated such that the solid waste material is treated on mesh screens of decreasing mesh size. For example, the decomposition chamber may have three mesh screens, an upper mesh formed from 25 mm woven mesh material, a middle mesh screen formed from 13 mm woven mesh material and a lower mesh formed from 5 mm woven mesh material. Other graduated mesh sizes may, of course, be used in the present invention.

Preferably, the decomposition chamber includes a population of worms and/or other suitable organisms for the decomposition of solid waste material. The worms and/or other organisms are preferably located on the mesh screens.

Preferably, the waste treatment system further comprises a vegetation cell for receiving solid material from the decomposition chamber. In its preferred form, the vegetation cell is placed underground (e.g. about 350 mm underground) in a trench and is aerated by means of a vent. A plant tube supporting a plant, such as a tree, may be disposed in the vegetation cell and separated from the vegetation cell by a porous medium. Nutrients and moisture from the vegetation cell may pass through into the plant tube via the porous medium. The plant tube may contain a suitable plant growing medium, such as potting mix or gravel. Hence, the vegetation cell may be used for supporting plant growth. One form of the vegetation cell used in the present invention is described in WO 02/89957.

The decomposition chamber may receive some liquids as well as solids, in which case the liquids will pass straight through the decomposition chamber into the vegetation cell. Excessive amounts of liquid in the vegetation cell are generally undesirable. Accordingly, the vegetation cell may be adapted to allow liquids to be pumped back to a trickle bed or the bioreactor. For example, liquids may be allowed to pass through the vegetation cell into a pumpwell, and then pumped back to a trickle bed or bioreactor.

A preferred form of the decomposition chamber used in the present invention is described in WO02/089957, which is incorporated herein by reference.

Turning now to the bioreactor this is preferably a Sequencing Batch Reactor (SBR) in a chamber for supporting bacteria under aerobic, anoxic and/or anaerobic conditions. The bacteria promote the digestion of a liquid-based waste material. The bioreactor will typically include a mechanical stirrer or agitator and may additionally include means for controlling temperature and pH. In its preferred form, the bioreactor is suitable for digesting the liquid-based waste material aerobically, anoxically and anaerobically. Hence, the bioreactor is preferably connected to an oxygen control system for controlling the concentration of oxygen in the bioreactor. The oxygen control system preferably comprises an oxygen source and a control valve, the control valve regulating the flow of oxygen reaching the bioreactor. When reference is made to oxygen herein, it is meant oxygen gas or any mixture of gases containing oxygen e.g. air. Preferably, the oxygen source is an air compressor, air blower and/or a venturi pump, which can suck air into the bioreactor.

As mentioned above, the liquid-based waste material processed in the bioreactor may include solids. Hence, the bioreactor may receive domestic waste, such as sewage, directly. Alternatively, the liquid-based waste material may be essentially liquid, the liquid-based waste material having first been processed by a separator unit before reaching the bioreactor. Combinations of these two alternatives are also envisaged in the present invention.

In a particularly preferred form of the present invention, the waste treatment system further comprises a separator unit for separating liquid and solid waste, the separator unit and bioreactor being in fluid communication such that liquid exiting the separator unit enters the bioreactor. Hence, the bioreactor is "downstream" of the separator unit.

Preferably, the separator unit includes the decomposition chamber described above. More preferably, the decomposition chamber treats solids separated from liquids in the separator unit in addition to the substantially solid waste material generated in the bioreactor. Generally, domestic waste enters the separator unit where it is separated into essentially solid and liquid waste. The solid waste is preferably processed in the decomposition chamber described above and, after processing, transferred to the vegetation cell described above.

Preferably, the separator unit also includes a trickle bed for treating liquid waste separated from solid waste in the separator unit. Typically, the trickle bed comprises a plurality of layers with alternating relatively coarse and relatively fine trickle bed media. Preferably, the trickle bed is maintained under essentially aerobic conditions for supporting aerobic bacteria. This may be achieved simply by having one or more vents in the separator unit.

Preferably, the trickle bed and the decomposition chamber are separated by a porous barrier which allows worms and other organisms to pass between the two (that is, the trickle bed and the decomposition chamber), but which prevents mixing of separated liquids and solids. Preferably, the trickle bed is formed in an annular space defined by the decomposition chamber, positioned centrally, and the external walls of the separator unit.

Liquid separated from solids in domestic waste typically passes through the trickle bed where it is digested, at least partially, by bacteria under aerobic conditions. Preferably, the trickle bed comprises a recirculation loop, such that liquid exiting the trickle bed may optionally be recycled back through the trickle bed for further treatment. Preferably, the separator unit also comprises a trickle bed control system for allowing the degree of treatment in the trickle bed to be controlled. For example, the trickle bed control system may be used to control the number of recycles through the trickle bed, thereby controlling the extent of digestion. In some circumstances, a relatively limited degree of digestion may be favourable, because liquids receiving limited treatment in the trickle bed are rich in carbon and may be used to optimise nitrification (conversion of ammonia to nitrate) and/or denitrification (conversion of nitrate to nitrogen) in the bioreactor.

Preferably, the recirculation loop includes an in-line venturi pump, wherein materials are transferable between treatment units in the waste treatment system by means of the venturi pump. Preferably, liquid is recirculated through the trickle bed by an electric pump. Preferably, the venturi pump creates a vacuum, which can be used to siphon materials between treatment units in the waste treatment system. The siphoning action is preferably controlled by a system of valves. The valves are preferably automatically operable and controlled by a central control system.

In an alternative arrangement, the separator unit does not comprise a trickle bed, such that liquid separated in the separator unit passes directly to the bioreactor.

The separator itself may be of any convenient design. However, a particularly preferred form of the separator is a geometric shape (e.g. a cone) that allows substantially all solid waste to fall off an outer surface and the majority of the liquid waste to flow on the surface and into, for example, a liquid collection means.

A particularly preferred form of the separator unit described above (including all the features of decomposition chamber, trickle bed, separator etc.) is described in WO02/089957, which is incorporated herein by reference.

In a preferred form of the present invention, the waste treatment system further comprises a membrane treatment unit in fluid communication with the bioreactor for treating liquid exiting the bioreactor. Hence, the membrane treatment unit is "downstream" of the bioreactor. The purpose of the membrane treatment unit is to remove any remaining solid particles, including pathogens, from the liquid.

The membrane treatment unit preferably comprises a membrane filter for separating fine particulate solids from liquid in the membrane treatment unit. The membrane filter may also remove some Faecal Coliforms, parasites and viruses from the liquid. Preferably, the membrane filter comprises synthetic microporous membranes in the form of hollow fibres bundles, tubular cartridges or flat sheet cartridges. The membranes may be microfilters or ultrafilters, as known by those skilled in the art, and are typically polymeric (e.g. polysulfones). The membrane treatment unit may include systems for automatically periodically cleaning the membrane filter. For example, a high pressure (100 kPa) backwash at predetermined intervals may be used to prevent clogging of the membrane filter. It is preferred that the concentration of dissolved oxygen in the membrane treatment unit is maintained in excess of about 2 mg/l to enhance filtration and to ensure that solid phosphates do not redissolve into the liquid.

In a particularly preferred form, the membrane treatment unit is in fluid communication with the trickle bed, the bioreactor or the decomposition chamber such that fine particulate solids captured in the membrane treatment unit can be transferred, usually as a liquid dispersion, to the trickle bed, bioreactor or decomposition chamber for further treatment. If necessary, the captured solids are mixed with sufficient quantity of water to facilitate their transferral to the trickle bed or bioreactor. Alternatively, the captured solids may be transferred to the decomposition chamber, depending on the quantity of liquid contained therein. Generally, it is preferred not to transfer excessive quantities of liquid to the decomposition chamber.

In another preferred form of the present invention, the waste treatment system further comprises a disinfecting unit in fluid communication with the membrane treatment unit for substantially disinfecting liquid exiting the membrane treatment unit. Hence the disinfecting unit is "downstream" of the membrane treatment unit.

The disinfecting unit preferably comprises a UV and/or ozone treatment zone, which kills or inactivates any remaining Faecal Coliforms, parasites or viruses in the liquid. If the liquid (now "water") is to be stored for more than about a day, it is preferred that chlorine is also added in a chlorine treatment zone. The chlorine is maintained in the water at residual levels and provides a lasting disinfecting effect.

The waste treatment system described above is preferably fully automated and controlled by a central control system. Suitable sensors or probes may be used to monitor conditions in the separator unit, the bioreactor, the membrane treatment unit and/or the disinfecting unit. This information may then be fed back to a central computer, which automatically adjusts operational parameters to optimise the treatment of waste water. The condition of liquid in the bioreactor is particularly important and the central computer may be used to control the carbon content of liquid feed, the sequencing of the SBR process, temperature, pH, oxygen levels etc. With a suitable central control system, the waste treatment may be left to run relatively unattended and without human intervention.

In a second aspect the present invention provides a waste treatment system suitable for domestic use comprising:

a bioreactor for digesting liquid-based waste material using bacteria, said bioreactor being operable under anaerobic, anoxic and/or aerobic conditions; and a trickle bed in fluid communication with the bioreactor, said trickle bed providing a liquid feed for the bioreactor;

wherein the degree of treatment in the trickle bed is adjustable such that digestion conditions in the bioreactor may be optimised.

In general, all preferred features of the first aspect of the present invention may be preferred features of the second aspect of the invention. In particular, the trickle bed preferably includes a recirculation system. Preferably, the degree of treatment in the trickle bed is determined by the number of recirculations through the trickle bed.

Preferably, the degree of treatment in the trickle bed is adjustable to provide an optimum level of carbon for nitrification and/or denitrification processes in the bioreactor. Hence, some relatively untreated liquid, having a high carbon content, may be periodically injected into the bioreactor to optimise denitrification.

In a third aspect, the present invention provides a waste treatment system suitable for domestic use comprising:

a treatment unit including a recirculation loop for recirculation of a liquid through said treatment unit; and a venturi pump in line with said recirculation loop;

wherein materials are transferable between treatment units in the waste treatment system by means of said venturi pump.

Preferably, the treatment unit including a recirculation loop is a trickle bed. Preferably, liquid is recirculated through the trickle bed by an electric pump. Preferably, the venturi pump creates a vacuum, which can be used to transfer materials between treatment units in the waste treatment system, such as by siphoning or direct suction. For example, liquid may be siphoned from the trickle bed to the bioreactor; substantially solid waste material may be siphoned from the bioreactor to the decomposition chamber; liquid may be siphoned from the bioreactor to the membrane treatment unit; captured fine particulate solids in the membrane treatment unit may be siphoned (together with some liquid, if required) to the trickle bed, the bioreactor or the decomposition chamber; liquid from the membrane treatment unit may be siphoned to the disinfecting unit etc.

The siphoning action is preferably controlled by a system of valves. The valves are preferably automatically operable and controlled by a central control system.

Alternatively, the venturi may transfer material (e.g. captured fine particulate solids from the membrane treatment unit) to the trickle bed recirculation loop by direct suction.

In general, all preferred features of the first and second aspects of the present invention may be preferred features of the third aspect of the present invention.

In a fourth aspect, the present invention provides a process for treating waste material comprising the steps of:
(a) providing a bioreactor for digesting liquid-based waste material using bacteria, said bioreactor being operable under anaerobic, anoxic and/or aerobic conditions;
(b) providing a decomposition chamber for decomposing substantially solid waste material, wherein the bioreactor and the decomposition chamber are in fluid communication;
(c) adding a liquid-based waste material to the bioreactor;
(d) digesting the liquid-based waste material in the bioreactor, thereby generating a liquid and a substantially solid waste material; and
(e) transferring said substantially solid waste material to said decomposition chamber.

The process of the present invention is preferably conducted using a waste treatment system as described above. Hence, the decomposition chamber and the bioreactor are preferably both of the form described above.

Preferably, step (c) includes mixing the liquid-based waste material with any material in the bioreactor remaining from a previous cycle of the waste treatment. This maximises efficiency and minimises the build up of permanent solids deposits in the bioreactor, which cannot be transferred to the decomposition chamber.

Preferably, step (d) includes digestion under conditions in which aerobic, anoxic and anaerobic zones can occur. Hence, this digestion is preferably conducted in a variable oxygenated environment, such that the concentration of dissolved oxygen is between 0.05 and 2.0 mg/l, more preferably between 0.1 and 1.5 mg/l, more preferably between 0.2 and 0.8 mg/l.

Preferably, step (d) also includes an aerobic digestion step. The aerobic digestion step is preferably conducted in an oxygenated atmosphere, such that the concentration of dissolved oxygen is greater than about 2.0 mg/l. A dissolved oxygen concentration of greater than about 2.0 mg/l ensures that the majority of solid phosphates do not redissolve into liquid in the bioreactor. Moreover, the use of two types of digestion steps is advantageous, because this maximises the degree of digestion in the bioreactor.

Preferably, step (e) includes a settling step in which solid waste material is allowed to settle out, and a decanting step in which supernatant liquid is removed from the bioreactor. Decanting supernatant liquid will generally be carried out before transferral of solid waste material to the decomposition chamber. This avoids transferring excessive amounts of liquid to the decomposition chamber.

In a particularly preferred form, the present invention provides a waste treatment process comprising the steps of:
(a) providing a bioreactor for digesting liquid-based waste material using bacteria, said bioreactor being operable under anaerobic, anoxic and/or aerobic conditions;
(b) providing a decomposition chamber for decomposing substantially solid waste material, wherein the bioreactor and the decomposition chamber are in fluid communication;
(c1) adding a liquid-based waste material to the bioreactor;
(c2) mixing the liquid-based waste material with any material in the bioreactor remaining from a previous waste treatment cycle;
(d1) digesting the liquid-based waste material in an oxygenated atmosphere, such that the concentration of dissolved oxygen is between 0.05 and 2.0 mg/l.
(d2) further digesting in an oxygenated atmosphere, such that the concentration of dissolved oxygen is greater than 2.0 mg/l;
(e1) allowing substantially solid waste material generated in steps (d1) and (d2) to settle;
(e2) decanting supernatant liquid; and
(e3) transferring the substantially solid waste material to the decomposition chamber for further treatment.

The stages in this process are preferably automated and controlled by a computer programmed with appropriate software. The length of the digestion steps (d1) and (d2) may be varied depending on the type of waste and the degree of waste treatment required. If, for example, a high BOD load is anticipated (e.g. parties, extra visitors etc.), then this information may be programmed into a control computer and the residence time in the bioreactor during the digestion steps changed accordingly.

As mentioned above, the liquid-based material may include some solids or it may be essentially a liquid exiting a separator unit. Thus, in a particularly preferred form, the process of the present invention further comprises the step of providing a separator unit, which may be of the form described above and/or described in WO02/089957.

In this preferred embodiment which includes providing a separator unit, the degree of treatment in the trickle bed is preferably controlled in order to optimise digestion conditions in the bioreactor. For example, suitable probes may be included in the bioreactor which monitor the conditions therein (e.g. concentration of dissolved oxygen, oxygen reduction potential etc.). This information may then be used to control the degree of treatment in the trickle bed and optimise conditions in the bioreactor.

Preferably, in the process of the present invention, liquid exiting the separator unit is periodically relatively untreated. This relatively untreated liquid may be used as an additional carbon source for optimising nitrification and/or denitrification in the bioreactor.

Preferably, the process of the present invention further comprises the steps of:
(f) providing a membrane treatment unit in fluid communication with the bioreactor; and (g) passing liquid from the bioreactor through the membrane treatment unit, thereby separating fine particulate solids from the liquid.

The membrane treatment unit is preferably of the type described above. In a particularly preferred form, the process comprises the further step of:

(h) transferring the fine particulate solids captured in the membrane treatment unit, optionally mixed with water, to the trickle bed, bioreactor or decomposition chamber.

Since the quantity of fine particulate solids generated in the membrane treatment unit is small, they are usually transferred (along with a suitable amount of water) back to the trickle bed or bioreactor. However, the transfer of these fine particulate solids to the decomposition chamber is also contemplated within the scope of this invention.

Preferably, the process of the present invention further comprises the steps of:

(i) providing a disinfecting unit in fluid communication with the membrane treatment unit; and (j) passing liquid from the membrane treatment unit through the disinfecting unit, thereby providing recycled water for domestic use.

The disinfecting unit is preferably of the type described above.

In a fifth aspect, the present invention provides a method of controlling digestion conditions in a bioreactor comprising: providing a trickle bed in fluid communication with said bioreactor, said trickle bed providing a liquid feed for said bioreactor, and adjusting the degree of treatment in the trickle bed such that digestion conditions in the bioreactor are optimised. Preferably, the degree of treatment in the trickle bed is adjusted to provide an optimum level of carbon for nitrification and/or denitrification processes in the bioreactor.

In a sixth aspect, the present invention provides a method of transferring materials between treatment units in a waste treatment system, comprising: providing a venturi pump in line with a recirculation loop in one treatment unit, and using said venturi pump to transfer materials between treatment units. Preferably, the treatment unit having a recirculation loop is a trickle bed.

BRIEF DESCRIPTION OF THE DRAWINGS

A preferred embodiment of the invention will now be described, by way of example only, with reference to the accompanying drawings in which:

FIG. 2 shows a simplified schematic view of a venturi pump system according to the present invention.

DESCRIPTION OF A PREFERRED EMBODIMENT

Figure 1:
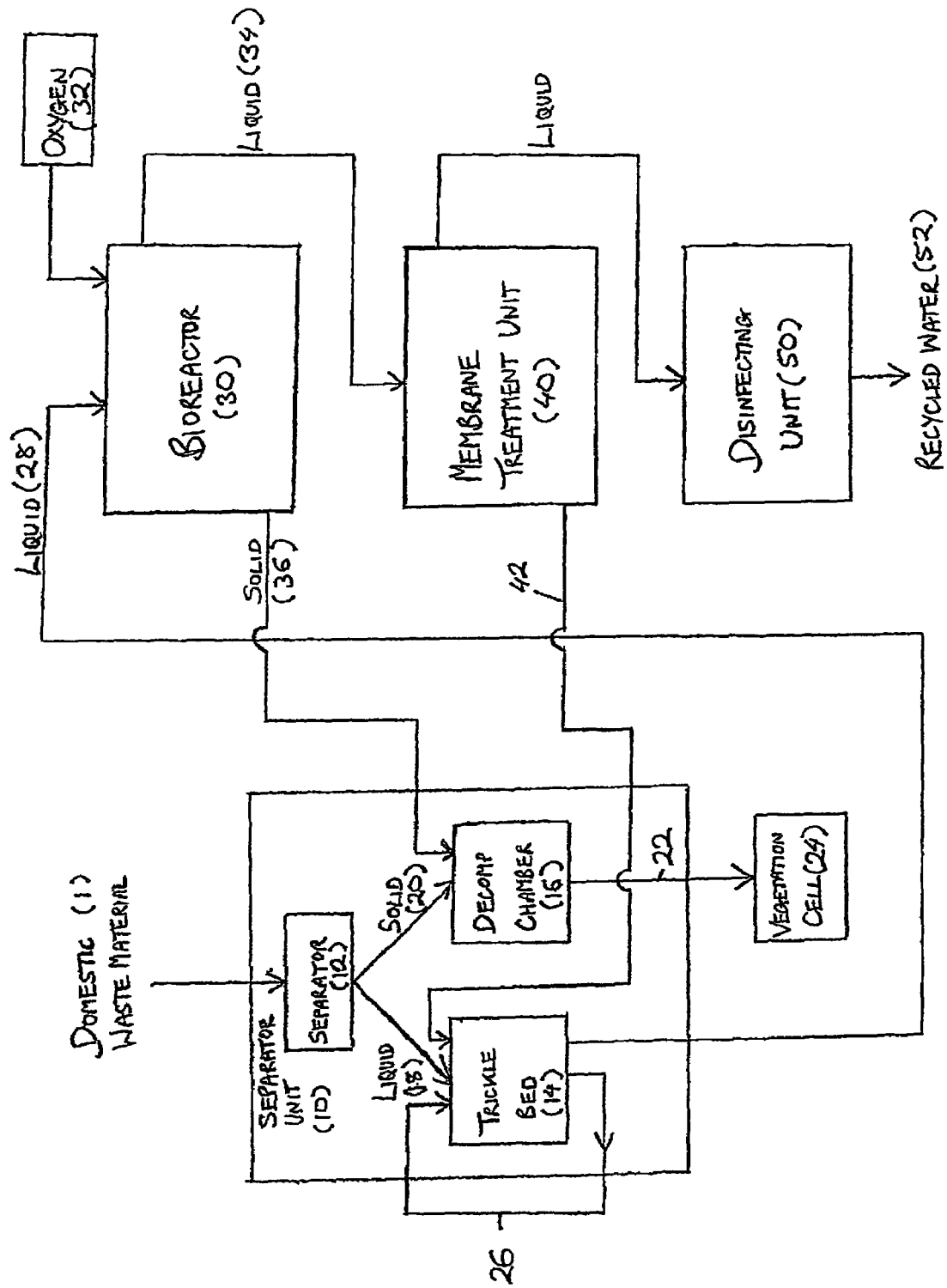
FIG. 1 shows a simplified schematic view of a waste treatment system according to the present invention.

Referring to FIG. 1, there is a shown a waste treatment system having a separator unit 10, a bioreactor 30, a membrane treatment unit 40 and a disinfecting unit 50.

Domestic waste material 1 enters the separator unit 10. The separator unit comprises a separator 12, trickle bed 14 and decomposition chamber 16.

The waste material 1 enters the separator 12 and is divided into liquid stream 18 and solid stream 20.

The solids 20 are fed into the decomposition chamber 16 where they decompose under natural aerobic processes, for example, on a series of mesh screens. A combination of living organisms on the mesh screens aid these decomposition processes. Solids which have broken down in the decomposition chamber 16 slowly fall to the bottom of the chamber through decreasing sized mesh screens. The mesh screens are configured to prevent untreated solids from moving directly to the bottom of the decomposition chamber 16. The treated solids 22 from the decomposition chamber are then pumped to the vegetation cell 24 with a small quantity of water.

The liquid stream 18 separated from the solids 20 enters an aerobic trickle bed 14. The liquid exiting the trickle bed may be recirculated back through the trickle bed via recirculation line 26, for further treatment. The degree of treatment in the trickle bed is controlled by a trickle bed 14 control system (not shown).

At predetermined times ranging from 4 to 8 hours, liquid is pumped from the separator unit 10 via line 28 to fill the bioreactor 30. In the bioreactor 30, a sequence of operations is carried out as follows:

(1) Fill

The bioreactor 30 is filled with liquid 28 from the separator unit 10.

(2) Mix

Incoming material is mixed with material retained in the bioreactor 30 after the previous cycle using a mixer.

(3) Low Oxygen Aeration

In the first aeration sequence, liquid is aerated from a compressor/oxygen source 32 via a control valve. Low levels of oxygen are maintained to promote anaerobic, anoxic and aerobic conditions in such a way that bacteria reduce BOD, phosphate and nitrogen. The oxygen levels are measured using an ORP (Oxygen Reduction Potential) probe and maintained between 0.2 and 0.8 mg/l by a suitable oxygen control system. Measurements from the probe are used to determine the efficacy of digestion in the bioreactor. The composition of feed liquid 28 into the bioreactor 30 may be adjusted to optimise conditions in the bioreactor 30, using the trickle bed control system e.g. additional carbon may be fed into the bioreactor by lowering the number of recycles in the trickle bed.

(4) High Oxygen Aeration

In the second aeration, the level of dissolved oxygen is set to exceed 2 mg/l. This ensures that the maximum amount of phosphate is retained in the solids.

(5) Settle

On completion of aeration, the material is allowed to settle in the bioreactor 30.

(6) Decant

After settling, a supernatant liquid 34 is drained from the top part (e.g. top 40%) of the bioreactor 30 to the membrane treatment unit 40.

(7) Solids Siphoned

At least part of the solids 36 remaining are then siphoned via line 36 from the bioreactor back to the decomposition chamber. A series of valve systems is used to control the liquid draining 34 and solid siphoning 36 steps.

Supernatant liquid 36 from step (6) above is transferred to the membrane treatment unit. This liquid is drawn through the membranes under 20 kPa vacuum into a treated water tank using a venturi. The membranes are regularly backwashed e.g. for 1 min at 100 kPa to optimise flow through the membranes. During backwash, air may be added to the base of the membrane to aid removal of solids and biofilm from the membrane surface. The membranes used are preferably ultrafiltration hollow fibres (polysulfone, nominal molecular weight cut off at 50 kD). Air is also programmed to be added for short periods to ensure liquid in the membrane treatment unit contains in excess of 2 mg/l of dissolved oxygen.

Apart from removing solids, the membranes provide a barrier for removing Faecal Coliforms, Cryptosporidium (typically 4-6 microns in diameter) and Giardia cysts (typically 12-20 microns in diameter), as well as other parasites and viruses.

A small quantity of solids 42 is removed from the bottom membrane unit on a regular basis. These solids, accompanied by some liquid, are siphoned back to the trickle bed 14.

After the treated water has passed through the membrane treatment unit, it may require or be desirable to undergo further disinfection to kill or inactivate any remaining Faecal Coliforms, parasites or viruses to provide suitable water 52 for recycling. This is carried out in a disinfecting unit 50 using UV or ozone, and in cases where storage is required for more than 24 hours, chlorine is added to maintain a residual level of disinfectant in the recycled water.

The waste treatment system has a central control system to control process parameters, enable the system to cope with varying load, control a membrane integrity test and monitor systems operation. Several signals will be regularly sent to a remote monitoring site, one indicating whether the system is operating satisfactorily or if there is a problem that needs attention immediately, and one providing information regarding general operating parameters.

It will be seen that the present invention provides a compact, self-contained waste treatment system suitable for domestic use, which requires little or no human intervention. The resultant recycled water will typically have the following quality parameters:

| | |
|---|---|
| BOD | <10 mg/l |
| SS | <5 mg/l |
| Total P | <10 mg/l |
| Total N | <10 mg/l |
| Tubidity | <1 NTU |
| Faecal Coliforms | <10 CFU |
| Cysts and other parasites | Not detectable |
| Viruses | <0.001% |

Referring to FIG. 2, there is shown a trickle bed having a liquid recirculation loop 26. A venturi pump 61 is in line with the recirculation loop 26. Liquid is recirculated and feeds through the venturi pump 61 by means of an electric pump 62. As liquid recirculates via the venturi pump 61, a vacuum is generated by the venturi action. This vacuum is used to control the transfer of materials throughout the waste treatment system by a siphoning action. Valves 63, 64, 65 and 66 are opened and closed in a predetermined sequence to create a siphon in a particular transfer conduit between two preselected treatment units. The venturi pump 61 in combination with the valves obviates the need for multiple electric pumps to effect individual transfer operations in the waste treatment system. However, some transfers throughout the waste treatment system may still be performed, or assisted by, electric pumps.

The skilled person will, of course, appreciate that the present invention has been described by way of example only and may be embodied in many other forms within the scope of the invention.

The invention claimed is:

1. A waste treatment system suitable for treating domestic waste, said system comprising:
   a bioreactor for digesting liquid-based waste material using bacteria, said bioreactor being operable under at least one of anaerobic, anoxic and aerobic conditions, wherein said bioreactor is connected to an oxygen control system for controlling concentration of oxygen in said bioreactor;
   a decomposition chamber for decomposing substantially solid waste material generated in said bioreactor; and
   a membrane treatment unit in fluid communication with said bioreactor for treating liquid exiting said bioreactor;
   wherein said bioreactor and said decomposition chamber are in fluid communication such that said substantially solid waste material generated in said bioreactor can be transferred to said decomposition chamber for further treatment.

2. The waste treatment system according to claim 1, wherein said decomposition chamber comprises a plurality of mesh screens arranged such that solid material passes through each said mesh screen.

3. The waste treatment system according to claim 2, wherein said mesh screens support at least one of worms and other organisms for the decomposition of said substantially solid waste material.

4. The waste treatment system according to claim 1, further comprising a vegetation-containing cell for receiving material from said decomposition chamber.

5. The waste treatment system according to claim 1, further comprising a separator unit for separating liquid and solid waste, said separator unit and said bioreactor being in fluid communication such that liquid exiting said separator unit enters said bioreactor.

6. The waste treatment system according to claim 5, wherein said decomposition chamber is included in said separator unit.

7. The waste treatment system of claim 5, wherein said separator unit includes a trickle bed for treating liquid waste separated from solid waste in said separator unit.

8. The waste treatment system according to claim 7, further comprising a recirculation loop, such that liquid exiting said trickle bed may be optionally recycled back through said trickle bed for further treatment.

9. The waste treatment system according to claim 7, further comprising a trickle bed control system for allowing the degree of treatment in said trickle bed to be controlled.

10. The waste treatment system according to claim 8, wherein the recirculation loop includes an in-line venturi pump, wherein materials are transferable between treatment units in the waste treatment system by means of said venturi pump.

11. The waste treatment system according to claim 1, wherein said membrane treatment unit is in fluid communication with said bioreactor, said trickle bed or said decomposition chamber such that fine particulate solids captured in said membrane treatment unit can be transferred to said bioreactor, said trickle bed or said decomposition chamber for further treatment.

12. The waste treatment system according to claim 1, further comprising a disinfecting unit in fluid communication with said membrane treatment unit for substantially disinfecting liquid exiting said membrane treatment unit.

13. A waste treatment system suitable for treating domestic waste, said system comprising:
   a bioreactor for digesting liquid-based waste material using bacteria, said bioreactor being operable under at least one of anaerobic, anoxic and aerobic conditions, wherein said bioreactor is connected to an oxygen control system for controlling the concentration of oxygen in said bioreactor; and a trickle bed in fluid communication with said bioreactor, said trickle bed providing a liquid feed for said bioreactor;

wherein the degree of treatment in said trickle bed is adjustable such that digestion conditions in said bioreactor are selectively controllable.

14. The waste treatment system according to claim 13, wherein the degree of treatment in said trickle bed is adjustable to provide an increased or decreased level of carbon for at least one of a nitrification process and a denitrification processes in said bioreactor.

15. A method of transferring materials between treatment units in a waste treatment system, said method comprising providing a venturi pump in-line with a recirculation loop in one said treatment unit, and using said venturi pump to transfer materials between said treatment units, and treating materials in a trickle bed within the recirculation loop.

16. The method of claim 15, further comprising digesting liquid-based waste material in a bioreactor, and filtering treated liquid from the bioreactor.

17. A waste treatment system suitable for treating domestic waste, said system comprising:

a bioreactor for digesting liquid-based waste material using bacteria, said bioreactor being operable under at least one of anaerobic, anoxic and aerobic conditions, wherein said bioreactor is connected to an oxygen control system for controlling concentration of oxygen in said bioreactor, wherein said decomposition chamber comprises a plurality of mesh screens arranged such that solid material passes through each said mesh screen; and a decomposition chamber for decomposing substantially solid waste material generated in said bioreactor;

wherein said bioreactor and said decomposition chamber are in fluid communication such that said substantially solid waste material generated in said bioreactor can be transferred to said decomposition chamber for further treatment.

18. The waste treatment system according to claim 17, wherein said mesh screens support at least one of worms and other organisms for the decomposition of said substantially solid waste material.

19. The waste treatment system according to claim 17, further comprising a vegetation-containing cell for receiving material from said decomposition chamber.

20. The waste treatment system according to claim 17, further comprising a separator unit for separating liquid and solid waste, said separator unit and said bioreactor being in fluid communication such that liquid exiting said separator unit enters said bioreactor, and wherein said decomposition chamber is included in said separator unit.

21. The waste treatment system of claim 17, wherein said separator unit includes a trickle bed for treating liquid waste separated from solid waste in said separator unit.

22. The waste treatment system according to claim 21, further comprising a recirculation loop, such that liquid exiting said trickle bed is optionally recycled back through said trickle bed for further treatment.

23. The waste treatment system according to claim 22, further comprising a trickle bed control system for controlling the degree of treatment in said trickle bed.

24. The waste treatment system according to claim 22, wherein the recirculation loop includes an in-line venturi pump, wherein materials are transferable between treatment units in the waste treatment system by said venturi pump.

25. A waste treatment system suitable for treating domestic waste, said system comprising:

a bioreactor for digesting liquid-based waste material using bacteria, said bioreactor being operable under at least one of anaerobic, anoxic and aerobic conditions, wherein said bioreactor is connected to an oxygen control system for controlling concentration of oxygen in said bioreactor;

a decomposition chamber for decomposing substantially solid waste material generated in said bioreactor; and a vegetation-containing cell for receiving material from said decomposition chamber;

wherein said bioreactor and said decomposition chamber are in fluid communication such that said substantially solid waste material generated in said bioreactor can be transferred to said decomposition chamber for further treatment.

26. The waste treatment system according to claim 25, wherein said decomposition chamber comprises a plurality of mesh screens arranged such that solid material passes through each said mesh screen, and wherein the mesh screens support organisms that assist in decomposition of waste.

27. The waste treatment system of claim 25, wherein said separator unit includes a trickle bed for treating liquid waste separated from solid waste in said separator unit.

28. The waste treatment system according to claim 27, further comprising a recirculation loop, such that liquid exiting said trickle bed is optionally recycled back through said trickle bed for further treatment.

29. The waste treatment system according to claim 25, further comprising a trickle bed control system for controlling the degree of treatment in said trickle bed.

30. The waste treatment system according to claim 25, wherein the recirculation loop includes an in-line venturi pump, wherein materials are transferable between treatment units in the waste treatment system by said venturi pump.

* * * * *